US011704055B2

(12) United States Patent
Lee

(10) Patent No.: US 11,704,055 B2
(45) Date of Patent: Jul. 18, 2023

(54) STORAGE DEVICE, CONTROLLER AND METHOD FOR OPERATING THEREOF

(71) Applicant: SK hynix Inc., Gyeonggi-do (KR)

(72) Inventor: Dong-Sop Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 160 days.

(21) Appl. No.: 16/510,557

(22) Filed: Jul. 12, 2019

(65) Prior Publication Data
US 2020/0183613 A1  Jun. 11, 2020

(30) Foreign Application Priority Data

Dec. 10, 2018 (KR) .......................... 10-2018-0158103

(51) Int. Cl.
G06F 3/06 (2006.01)
G06F 11/10 (2006.01)

(52) U.S. Cl.
CPC .......... *G06F 3/0658* (2013.01); *G06F 3/0619* (2013.01); *G06F 3/0683* (2013.01); *G06F 11/1068* (2013.01)

(58) Field of Classification Search
None
See application file for complete search history.

(56) References Cited

U.S. PATENT DOCUMENTS

| 9,029,829 | B1* | 5/2015 | Echeverry | G11C 11/005 |
| | | | | 257/4 |
| 10,891,057 | B1* | 1/2021 | O'Brien, III | G06F 3/0616 |
| 2002/0157056 | A1* | 10/2002 | Chaudhry | G06F 11/1064 |
| | | | | 714/763 |
| 2005/0278568 | A1* | 12/2005 | Delaney | G06F 11/1076 |
| | | | | 714/13 |
| 2008/0304330 | A1* | 12/2008 | Bains | G11C 7/1006 |
| | | | | 365/189.02 |
| 2009/0024787 | A1* | 1/2009 | Yim | G06F 12/0246 |
| | | | | 711/103 |

FOREIGN PATENT DOCUMENTS

KR    10-1623119    5/2016

OTHER PUBLICATIONS

Park et al., Inverted bit-line sense amplifier with offset-cancellation capability, John Wiley & Sons, Apr. 2016, vol. 52, No. 9, pp. 692-694; Downloaded from https://ietresearch.onlinelibrary.wiley.com/doi/epdf/10.1049/el.2015.4368. (Year: 2016).*
Yang, Y. S. et al., De-duplication of Parity Disk in SSD-Based RAID System, Journal of The Institute of Electronics Engineers of Korea, Jan. 2013, pp. 105-113, vol. 50, No. 1, Department of Electronics Engineering, Inha University.

* cited by examiner

*Primary Examiner* — Arpan P. Savla
*Assistant Examiner* — Eric T Loonan
(74) *Attorney, Agent, or Firm* — IP & T Group LLP

(57) ABSTRACT

A storage device and a method for operating the storage device efficiently manage the data stored in an internal memory and the parity for the data in a storage device.

19 Claims, 14 Drawing Sheets

P0 = M0 XOR M1 XOR M3 XOR M4 XOR M6

P1 = M0 XOR M2 XOR M3 XOR M5 XOR M6

P2 = M1 XOR M2 XOR M3 XOR M7

P3 = M4 XOR M5 XOR M6 XOR M7

P4 = M0 XOR M1 XOR M2 XOR M3 XOR M4 XOR M5 XOR M6 XOR M7
     XOR P0 XOR P1 XOR P2 XOR P3

P0' = P0 XOR ((M4 XOR M4') XOR (M6 XOR M6'))

P1' = P1 XOR ((M5 XOR M5') XOR (M6 XOR M6'))

P2' = P2 XOR (M7 XOR M7')

P3' = P3 XOR ((M4 XOR M4') XOR (M5 XOR M5') XOR (M6 XOR M6') XOR (M7 XOR M7'))

P4' = P4 XOR ((M4 XOR M4') XOR (M5 XOR M5') XOR (M6 XOR M6') XOR (M7 XOR M7'))
    XOR (P0 XOR P0') XOR (P1 XOR P1') XOR (P2 XOR P2') XOR (P3 XOR P3')

*FIG.6*

| B | A | A' = A XOR B |
|---|---|---|
| 0 | 0 | 0 |
| 0 | 1 | 1 |
| 1 | 0 | 1 |
| 1 | 1 | 0 |

IF B=0, A IS KEEPED

IF B=1, A IS INVERTED

*FIG.10*

| OLD[i] | INV[i] | INV_CELL[i] | NEW[i] | D[i] |
|---|---|---|---|---|
| 0 | 0 | 1 | 0 | 0 |
| 0 | 1 | 1 | 1 | 1 |
| 1 | 0 | 0 | 0 | 1 |
| 1 | 1 | 0 | 1 | 0 |

US 11,704,055 B2

STORAGE DEVICE, CONTROLLER AND METHOD FOR OPERATING THEREOF

CROSS-REFERENCE TO RELATED APPLICATION

The present application claims priority under 35 U.S.C. 119(a) to Korean patent application number 10-2018-0158103, filed in the Korean intellectual property office on Dec. 10, 2018, which is incorporated herein by reference in its entirety.

BACKGROUND

1. Technical Field

An aspect of the present disclosure relates to a storage device and a method for operating thereof.

2. Related Art

A storage device stores data based on a request of a host such as a computer or a smart phone.

The storage device stores various types of data including a program code in an internal memory. The storage device needs to efficiently manage such data.

SUMMARY

In accordance with an aspect of the present disclosure, there is provided a storage device and a method for operating thereof for efficiently managing data stored in an internal memory and parity for the data.

In accordance with an aspect of the present disclosure, there is provided a storage device. The storage device may comprise a semiconductor memory device and a controller for controlling the semiconductor memory device.

The controller may comprise a data updater and a parity updater. The data updater may control so as to update an original data in or at an area indicated by the address to a first data based on the address, information on the updated data bits and a target data for the updated data bits. The parity updater may control so as to update a parity for the data at the area to a target parity, using a second data obtained based on the original data, the information on the updated data bits and the target data.

In accordance with an aspect of the present disclosure, there is provided a memory system. The memory system may comprise a first memory device configured to store original data including data to be updated to externally provided target data. The memory system may comprise a second memory device configured to store original parity for the original data. The memory system may comprise a controller configured to generate first data based on the original data and the target data, to control the first memory device to update the original data to the first data, to generate second data through an XOR operation to the original data and the first data, to generate target parity based on the original parity and the second data according to a parity scheme of the original parity and to control the second memory device to update the original parity to the target parity.

In accordance with an aspect of the present disclosure, there is provided a method for operating a storage device. The method may comprise updating a data at an area of the semiconductor memory device indicated by the address from an original data previously stored at the area to a first data based on the address, information on the updated data bits and a target data for the updated data bits and updating a parity for the data at the area to a target parity, using a second data obtained based on the original data, the information on the updated data bits and the target data.

The present disclosure may efficiently manage data stored in an internal memory and parity for the data in a storage device.

BRIEF DESCRIPTION OF THE DRAWINGS

FIG. 6 is a diagram for explaining the principle of performing the XOR operation on the original data and the data to be updated without reading the original data on the basis of the characteristics of the XOR operation in accordance with an embodiment.

FIG. 10 is a diagram comparing many kinds of values corresponding to the bit indicated by the index i used in the first memory chip in FIG. 7.

DETAILED DESCRIPTION

Figure 1:
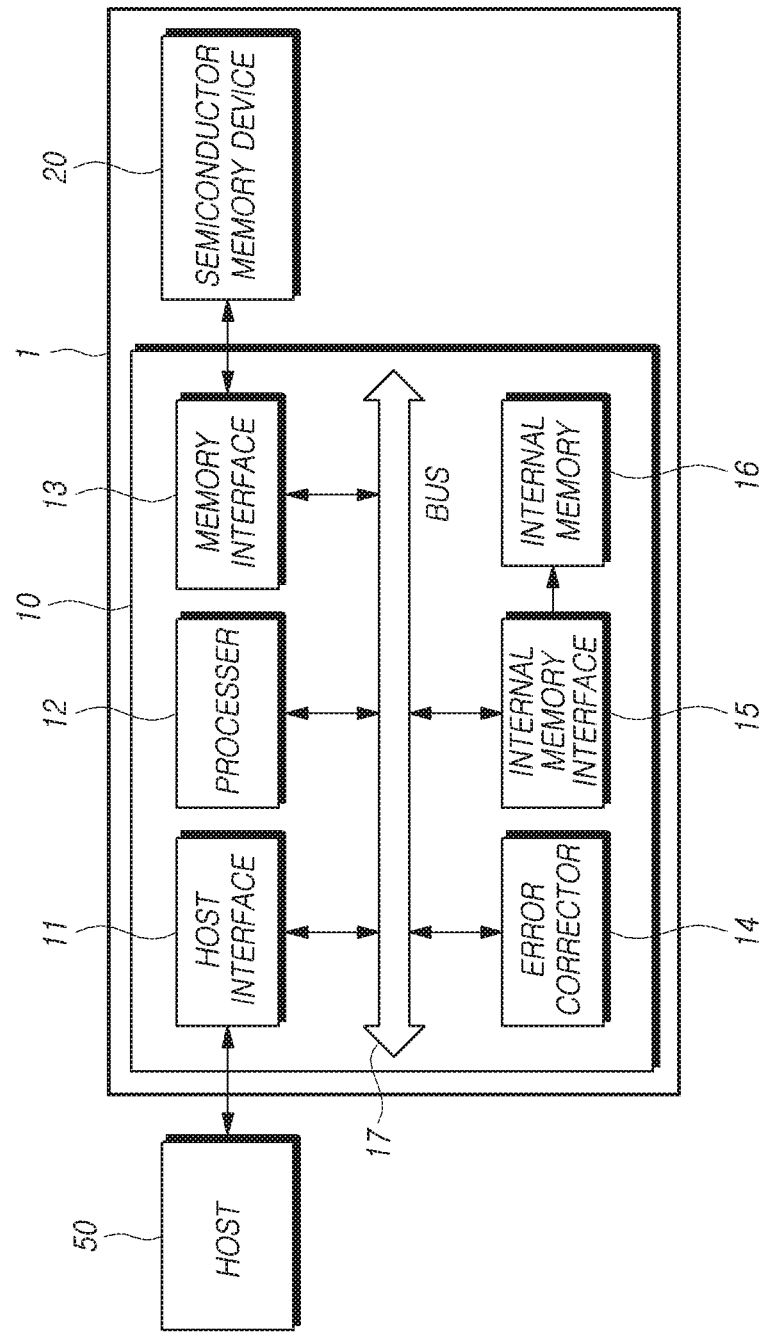
FIG. 1 is a block diagram illustrating a storage device in accordance with an embodiment.

A semiconductor memory device of a three-dimensional structure is described below with reference to the accompanying drawings through various embodiments. In the following embodiments like elements are identified by like names and reference numerals. Throughout the specification, reference to "an embodiment," "another embodiment" or the like is not necessarily to only one embodiment, and different references to any such phrase are not necessarily to the same embodiment(s).

In describing embodiments of the present disclosure, description of known related art may be omitted so as not to obscure aspects of the present invention.

Although terms such as first and second may be used to identify various components, the components are not limited by the terms; such terms are used only to distinguish components having the same or similar names.

The terminology used herein is for the purpose of describing particular embodiments only and is not intended to be limiting of the present invention. As used herein, singular forms are intended to include the plural forms and vice versa, unless the context clearly indicates otherwise.

It will be further understood that the terms "comprises", "comprising", "includes", and "including" when used in this specification, specify the presence of the stated elements and do not preclude the presence or addition of one or more other elements. As used herein, the term "and/or" includes any and all combinations of one or more of the associated listed items.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

Hereinafter, the various embodiments of the present invention will be described in detail with reference to the attached drawings.

FIG. 1 is a block diagram illustrating a storage device in accordance with an embodiment.

Referring to FIG. 1, a storage device 1 includes a controller and a semiconductor memory device 20. The storage device 1 may be a non-volatile semiconductor memory device, such as a solid state drive (SSD), a universal flash storage (UFS) device, an eMMC (embedded Multi Media Card) device, or the like, as well as a device for storing data on a magnetic disk such as a hard disk drive.

The controller 10 receives a request from the host 50 and may control the operation of the semiconductor memory device 20 based on the received request. For example, the controller 10 may control write, read, erase, and background operations on the semiconductor memory device 20. As an example, the background operation may be a garbage collection, a wear leveling, a bad block management operation, or the like.

The controller 10 may include a host interface 11, a processor 12, a memory interface 13, an error corrector 14, an internal memory interface 15, an internal memory 16 and a bus 17.

The host interface 11 provides an interface for communication with an external host 50.

The memory interface 13 provides an interface for communication with the semiconductor memory device 20.

The error corrector 14 may perform error correction on the data stored in the semiconductor memory device 20. The error corrector 14 may perform error correction on the data stored in the internal memory 16. The error corrector 14 may detect or correct an error on the data by using a parity such as an error detection code (EDC) parity or an error correction code (ECC) parity corresponding to each stored data.

The internal memory 16 is disposed inside the controller 10. The internal memory 16 may store program codes, commands or data necessary for driving the controller 10. The internal memory 16 may be used as a working memory, a cache memory, or a buffer memory in the controller 16. The internal memory 16 may be a memory device such as SRAM (static RAM), DRAM (dynamic RAM), SDRAM (Synchronous DRAM), or the like. The internal memory 16 may be a nonvolatile memory in which the stored data is lost when the power supply is interrupted.

The internal memory 16 may store a map table for managing the semiconductor memory device 20. Since the data size that may be stored in the internal memory 16 is limited, the internal memory 16 caches a part of the map table, and if necessary, repeatedly loads the map table data from, or unloads such data to, the semiconductor memory device 20.

The internal memory interface 15 may function as a buffer for the internal memory 16 such as the working memory, the cache memory, or the buffer memory used by the processor 12.

The bus 17 may be configured to provide a channel between the components of the controller 10.

The processor 12 may control all operations of the controller 10 and perform logical operations. The processor 12 may communicate with the external host 50 via the host interface 11 and with the semiconductor memory device 20 via the memory interface 13. The processor 12 may control the error corrector 14. The processor 12 may perform a data read/write operation by reading data from, or writing data to, the internal memory 16.

The processor 12 may perform the functions of a flash translation layer (FTL). The processor 12 may convert a logical block address (LBA) provided by the host 50 into a physical block address (PBA) through a flash translation layer (FTL). The flash translation layer (FTL) may receive a logical block address (LBA) and convert the logical block address (PBA) into a physical block address (PBA) using the mapping table stored in the internal memory 16. There are various address mapping methods in the flash translation layer (FTL), depending on the mapping unit. For example, the address mapping methods include a page mapping method, a block mapping method, and a hybrid mapping method.

The processor 12 is configured to randomize data received from the host 50 during a write operation. For example, the processor 12 may randomize the data received from the host 50 using a randomizing seed. The randomized data is provided to the semiconductor memory device 20 as data to be stored and is programmed into the memory cell array.

The processor 12 is configured to derandomize data received from semiconductor memory device 20 during a read operation. For example, the processor 12 may derandomize the data received from the semiconductor memory device 20 using a derandomizing seed. The de-randomized data may be output to the host 50.

As described above, the storage device 1 performs read and write operations on the semiconductor memory device 20 in accordance with the contents of the command defined by the protocol, in response to the request of the host 50.

The storage device 1 may be implemented as a System on Ship (SoC) system integrated in a single chip together with a communication device or a display device. At present, as the technode of the SoC gets lower and ASIC (Application Specific Integrated Circuit) technology of 28 nm to 16 nm or less is employed, the density of the internal memory 16 such as the SRAM, DRAM, or the like storing the program code and data for executing the logic in which the storage device 1 operates becomes larger and larger. In order to satisfy higher requirements, the storage device 1 needs to perform more varied and complex operations at high speed.

On the other hand, environmental constraints of the system in which the storage device 1 is mounted are continuously increasing. For example, the size and the refresh rate of liquid crystal display devices are continuously increasing, and data rates supported by communication schemes such as WiFi and LTE are continuously increasing.

Therefore, expensive printed circuit boards (PCBs) and components are required for the storage device 1 to be resistant to power noise caused by other devices located on such a system. This leads to a rise in the overall BOM (Bills Of Materials). The BOM is a list of the raw materials, sub-assemblies, intermediate assemblies, sub-components, parts, and the quantities of each needed to manufacture an end product.

Such external factors can intermittently cause a bit flip to occur on the data stored in the internal memory 16 such as the SRAM, DRAM or the like on the storage device 1. There is a high possibility that the internal memory 16 having higher performance and capacity is forced to operate in a sub-normal operating condition because of not only bit flip by existing alpha particles but also a bad system environment. The risk of higher cost and design validation to overcome this situation is also increasing steadily.

On the other hand, the operating temperature, voltage level, low power design and environment of the main board also increase the above-mentioned problems. In automobiles as well as mobile devices, this problem has become an important issue. Therefore, there is a need to solve these problems with appropriate effort and cost and to satisfy the related requirements.

The embodiments described below are designed to cope with a soft error because of a bit flip or the like when the internal memory 16 such as a large capacity SRAM, DRAM or the like is used in the storage device 1. The embodiments described below provide a method of managing data and parity in order to cope with the soft error when a protection unit is large (e.g., 128 bytes or 512 bytes) and a size of partial data within the protection unit actually being updated is small (e.g., 1 to 4 bits).

Conventional methods for coping with the soft error occurring in the internal memory 16 can be largely classified into three types.

1) No Protection

Screening is performed as much as possible in the ASIC and package process and the ASIC DIE is aligned with the resistance. However, there is no further mechanism for detecting/correcting the soft error.

2) Overkill Protection

Overkill protection is a method of applying an EDC/ECC parity to a minimum write unit. For example, if the minimum write unit is 32 bits, the overkill protection may configure either 1 bit of EDC parity or 7 bits of ECC parity.

3) Compromised Protection

Compromised protection is a method in which a plurality of minimum write units are grouped together to form one large protection unit and an EDC/ECC parity is applied to the protection unit. For example, the compromised protection may configure an EDC/ECC parity for the large protection units of 128 byte, 256 byte, or 512 byte data.

Comparing the above three methods, the no protection scheme has an overhead because of the ASIC screening, increases the cost of the package and the SoC system, and may be vulnerable to unexpected bit flip generation.

The overkill protection scheme adds overhead of parity for each write unit, so that the overhead of parity against data can be excessively large. For example, when 1 bit of EDC parity is used per 32 bit write unit, an overhead of about 3% ($=1/32$) may occur. When 7 bits of ECC parity is used, an overhead of about 17% ($=7/32$) may occur.

Finally, the compromised protection scheme may significantly reduce parity overhead compared to the overkill protection scheme. For example, a compromised protection scheme may use one bit of parity per 128 bits or two bytes (16 bits) of parity per 256 bytes. In this case, the overhead of parity for data may be less than 1%.

However, the compromised protection scheme may be inferior to the overkill protection scheme in terms of latency. This is because even if only some of the write units in the protection unit change, the parity needs to be calculated by reading the data of the entire protection unit.

Particularly, when the processor 12 executes a partial write in a unit of a byte, half-word, or full-word for the data stored in the internal memory 16, the compromised protection scheme becomes a problem for protecting the data.

The partial write may be defined as a write operation in a unit smaller than a protection unit. For example, when the protection unit is set to 512 bits, the processor 12 may write to only 1 bit, 2 bits, or 4 bits of such unit instead of writing to all 512 bits. This is an example of a partial write.

In this case, the write operation may be performed in the write unit by using the above-described overkill protection scheme. Using the overkill protection scheme, the write operation is performed only in the write unit, so that the area to be accessed in the write operation may be minimized.

However, when the overkill protection scheme is used, the storage space used for parity may be increased.

As an example, the storage device 1 may configure a parity for every 8 bits, which is the minimum write unit of the processor 12. For example, the storage device 1 need to additional store a total of 5 bits of the parity including a 4 bits value generated by the Hamming rule and a 1 bit checksum for SECDED (Single-Error-Correction Double-Error-Detection). In this case, since about 640 KB of parity is added for 1 MB of data, overhead for storage space may be very large.

When using the compromised protection scheme, the storage device 1 may configure 2 bytes of ECC parity for each 256 byte protection unit. In this case, since the overhead of the parity added for the data protection scheme is less than 1%, the compromised protection scheme is advantageous over the overkill protection scheme described above.

On the other hand, in the case of using the compromised protection scheme, after all the data of the protection unit is read, only the data of the part to be changed is updated, and then the parity for the data of the protection unit is calculated, and the entire data and the parity are finally written in the internal memory 16.

For example, even when only one byte of data of 256 bytes is updated, a read-modify-write operation is performed on 256 bytes, which is the whole protection unit, in order to calculate its parity, so that the overhead in terms of read/write operation can be increased.

Accordingly, there is a need for reducing overhead for updating the data and the parity when a partial write operation is performed for to-be-updated data that is a very small percentage of the entire protection unit.

In an embodiment, a storage device capable of reducing overhead for updating the data and the parity in a partial write operation and an operation method thereof are described in detail. Although embodiments are described in the context of partial writing that may occur when the compromised protection scheme is used, the operations described may be applied to partial writing used in other methods such as the overkill protection scheme.

Figure 2:
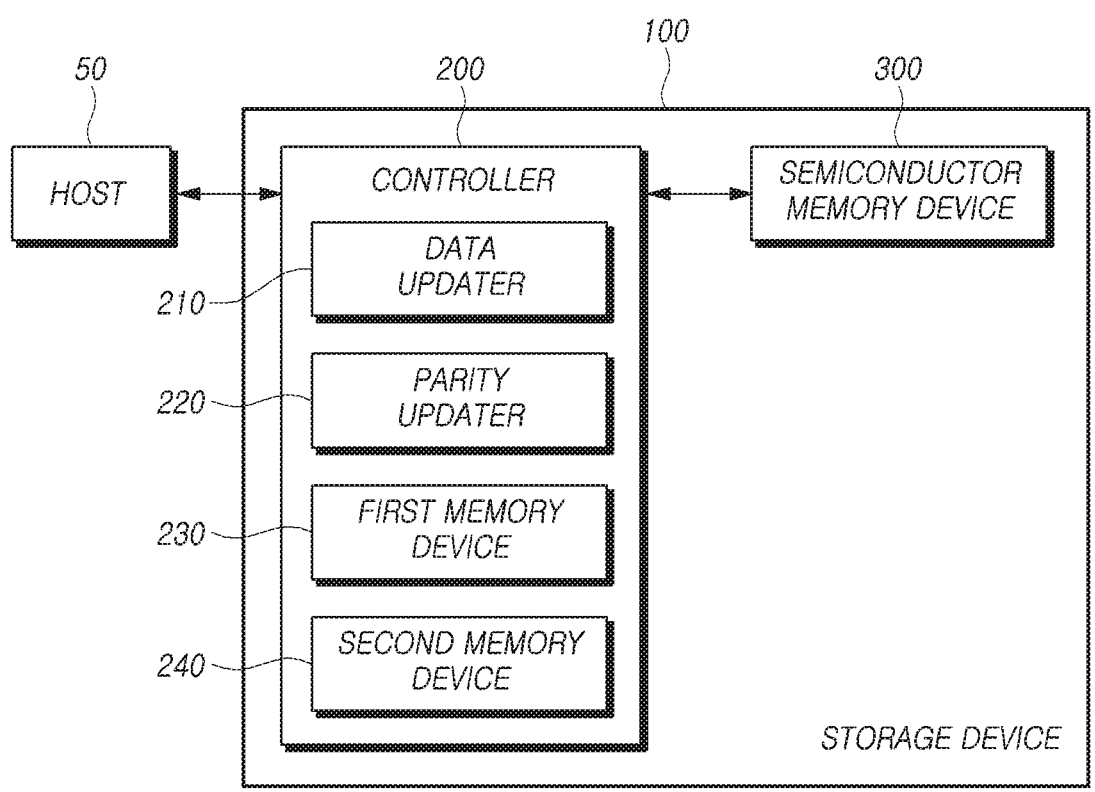
FIG. 2 is a block diagram illustrating a storage device in accordance with an embodiment.
Figure 3:
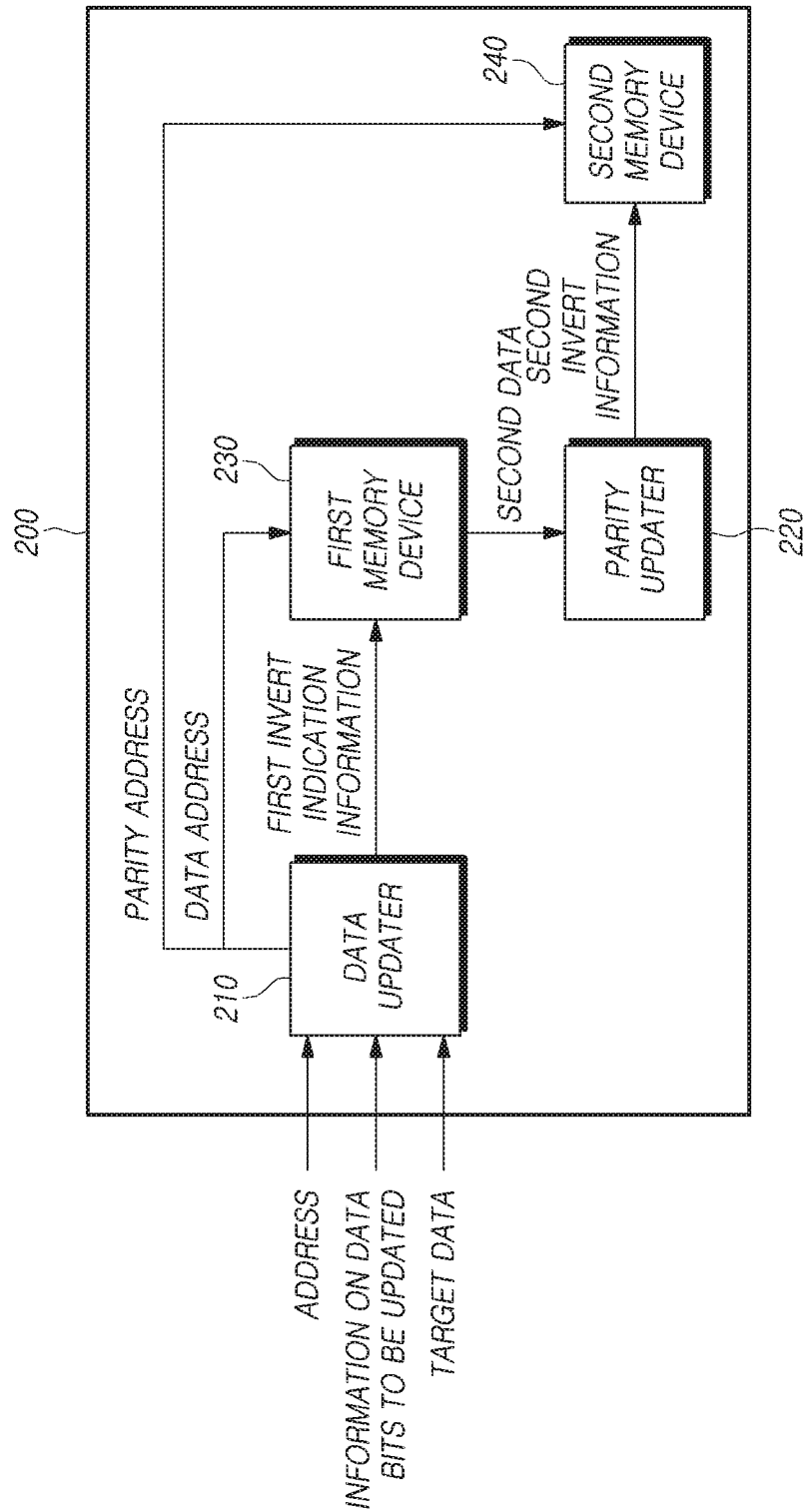
FIG. 3 is a block diagram illustrating an operation of a controller, such as that in FIG. 2.

FIG. 2 is a block diagram illustrating a storage device in accordance with an embodiment. FIG. 3 is a block diagram illustrating an operation of the controller in FIG. 2.

Referring to FIG. 2, the storage device 100 may include a controller 200 and a semiconductor memory device 300. The controller 200 and the semiconductor memory device 300 may be the same as the controller 10 and the semiconductor memory device 20 in FIG. 1.

For example, the controller 200 may receive a request from the host 50, control the semiconductor memory device 300 based on the received request, and send a response to the host 50, if necessary.

In addition, instead of receiving a direct request from an host 50, the controller 200 may receive a request through an internal host interface and control the semiconductor memory device 300 based on the received request.

The semiconductor memory device 300 may store the data. The semiconductor memory device 300 operates under the control of the controller 200.

The semiconductor memory device 300 may include a memory cell array including a plurality of memory cells for storing the data. In an embodiment, the semiconductor memory device 300 may include a NAND flash memory, a vertical NAND flash memory, a NOR flash memory, a resistive random access memory (RRAM), a phase-change memory (PRAM), a magnetoresistive random access memory (MRAM), a ferroelectric random access memory (FRAM), a spin transfer random access memory (STT-RAM) or the like.

The semiconductor memory device 300 is configured to receive commands and addresses from the controller 200 and access selected areas of the memory cell arrays by addresses. The semiconductor memory device 300 may perform an operation corresponding to the command for the area selected by the address.

For example, the semiconductor memory device 300 may perform a program operation, a read operation, and an erase operation. In the operation program, the semiconductor memory device 300 may program or write data in the area selected by the address. In the read operation, the semiconductor memory device 300 may read data from an area selected by the address. In the erase operation, the semiconductor memory device 300 may erase the data stored in the area selected by the address.

The host 50 may include at least one operating system that generally manages and controls the functionality and operation of the host 50 and may include interoperability between the storage device 100 and the host 50. The host 50 may be one of various electronic devices, for example, a mobile phone, an MP3 player, a laptop computer, a desktop computer, a game machine, a TV, a projector, an automotive and the like.

Referring to FIGS. 2 and 3, the controller 200 may further include a data updater 210 and a parity updater 220. The controller 200 may also include a first memory device 230 and a second memory device 240.

The data updater 210 and the parity updater 220 may be implemented with hardware or software in the controller 200.

The controller 200 includes the processor 12 and the error corrector 14 described with reference to FIG. 1 and operations of the data updater 210 and the parity updater 220 may performed by the processor 12 and the error corrector 14, respectively.

For example, the processor 12 may be configured to drive firmware that performs operations to update data and parity during a partial writing operation to original data stored in the first memory device 230. The first memory device 230 may store original data, a portion of which (partial data) is to be updated to a target data through the partial writing operation. The second memory device 240 may store original parity for the original data. The original parity may be updated to a target parity according to the update of the partial data. The above-described firmware may be driven according to the operation of the processor 12. The data updater 210 and the parity updater 220 may be implemented according to the processor 12 and the firmware driven by the processor 12.

The first memory device 230 and the second memory device 240 may be part of the internal memory 16 described with reference to FIG. 1. The first memory device 230 and the second memory device 240 may be implemented by physically separated chips, or may be implemented by one chip with physically separated storage areas.

The data updater 210 may control so as to update the original data stored in an area indicated by an address to first data based on the address, information on to-be-updated data bits and target data for the to-be-updated data bits.

Here, the first data may be determined as a value reflecting the target data for the bits updated in the original data described above. For example, assume that the original data is represented by binary data 01101111, and the index of each data bit of the original data is represented by 0 to 7. If the data bits of indexes 4 to 7, as the target data, are updated from 1111 to 1010, the first data may be determined as 01101010.

In the present embodiment, it is assumed that the controller 200 receives the information on the to-be-updated data bits as to which bits are to be updated in the data stored in the area indicated by the address.

For example, assuming that 512 bits of the original data are stored at the area indicated by the address and only 1 bit of the original data is updated, the data updater 210 may receive information indicating which bit is to be updated and therefore may not be required to perform an additional operation to determine which of the 512 bits is to be updated.

The data updater 210 may use the first memory device 230 to update some data in the original data such that the original data becomes the first data.

In one example, the data updater 210 may generate first invert indication information for the data based on the information on the to-be-updated data bits and the target data for the to-be-updated data bits, and then output the first invert indication information to the first memory device 230.

The first invert indication information indicates whether the inverted value or the original bit value for any bit of the original data previously stored in the area indicated by the address is output. The inverted value is "1" if the original bit value is "0", and "0" if the original bit value is "1".

Through the first invert indication information, the data updater 210 may indicate whether the first memory device 230 outputs either the inverted value or the original bit value for each bit of the original data previously stored in the area indicated by the address.

In an embodiment, the value of the first invert indication information transmitted to the first memory device 230 may be the same as that of the target data or the first data, but it is not limited thereto.

However, outputting the inverted value or the original bit value for each bit of the original data and updating the original data value to the first data value using the invert indication information are separate operations. Therefore, the inverted value or the original bit value for each bit of the original data to be output and the first data actually updated in the area indicated by the address may be different from each other.

When the data updater 210 transfers the first invert indication information to the first memory device 230, the data updater 210 may transfer a data address of the original data to be updated to the first memory device 230 to notify the first memory device 230 of an area indicated by the data address and may transfer a parity address of the original parity for the original data to the second memory device 240 to notify the second memory device 240 of an area indicated by the parity address. The original data may be updated to the first data and the original parity for the original data may be updated to a target parity for the first data. The first data may be overwritten on the original data in the area indicated by the data address within the first memory device 230 and the target parity for the first data may be overwritten on the original parity in the area indicated by the parity address within the second memory device 240.

The first memory device 230 may store the data in an area indicated by a data address. When the first memory device 230 receives the data address and a read/write request from host 50, the first memory device 230 may perform a read/write operation on the data at the area corresponding to the data address.

The first memory device 230 may receive the first invert indication information from the data updater 210 and update the original data stored in the area indicated by the data address to the first data using the received first invert indication information. The first memory device 230 may update the original data to the first data using the first invert indication information which may be the same as that of the first data.

For example, the first memory device 230 may temporarily store the first invert indication information, and then overwrite the temporarily stored first invert indication information as the first data in the memory cell where the original data is stored.

The first memory device 230 may also output second data used to update the original parity for the original data to a target parity for the first data, the original parity being stored in the area indicated by a parity address. The first memory device 230 may include an input terminal for receiving the first invert indication information.

In this case, the second data is generated on the basis of the original data and the first invert indication information.

An example in which the first invert indication information and the second data are obtained based on the original data and the target data will be described below.

For example, it is assumed that the 8-bit original data has a binary value 00000101, the values of bits 0 to 3 are maintained at 0000, the values of bits 4 to 7 are to be updated from 0101 to 1101. In other words, the original data 00000101 is to be updated to the first data 00001101.

In this case, the first invert indication information may be 00001101, which is the same value as the first data.

A bit value in second data is determined to be the same as a corresponding bit value in the original data if a value of a corresponding to bit in the first invert indication information is "0". A bit value in second data is determined to be an inverted value of a corresponding bit value in the original data if a bit value of a corresponding bit in the first invert indication information is "1". That is, the second data may be a result of the XOR operation on the original data and the first data (i.e., the first indication information).

Specifically, since the values of bits 0 to 3, and 6 of the first invert indication information are 0, the values of bits 0 to 3, and 6 of the second data are the same as those of the original data.

Since the value of bits 4, 5 and 7 of the first invert indication information is 1, those of the second data are determined as inverted values of bits 4, 5 and 7 of the original data, respectively.

The table 1 summarizes the above-mentioned examples as follows. When the data is 8 bits and bits 4 to 7 in the original data are to be updated, the bits to be updated (target data) are bracketed by < >. For example, the original data is 0000101, the first data is 00001101 and the target data is 1101 bracketed by < > within the first data.

TABLE 1

| Kind of data | Value |
| --- | --- |
| Original data | 0 0 0 0 <0 1 0 1> |
| First data including target data which is bracketed | 0 0 0 0 <1 1 0 1> |
| First invert indication information | 0 0 0 0 <1 1 0 1> |
| Second data | 0 0 0 0 <1 0 0 0> |

The parity updater 220 may control so at to update the original parity for the original data to the target parity in the second memory device 240 using the second data output from the first memory device 240 and the parity address provided from the data updater 210.

The parity updater 220 may control the second memory device 240 to update the original parity for the original data to the target parity for the first data.

For example, the parity updater 220 may generate the target parity based on the second data output from the first memory device 230 and may transfer the target parity to the second memory device 240. The second memory device 240 may update the original parity for the original data to the target parity for the first data.

Although the target parity may be generated using the second data described above, it may be the same as a parity calculated based on the first data. That is, the target parity for the first data may be generated not based on the first data but based on the second data in accordance with an embodiment of the present disclosure. The processes for calculating the target parity for the first data based on the second data output from the first memory device 230 will be described below with reference to FIGS. 4 to 11.

The second memory device 240 may store parity for data, which is stored in the first memory device 230, in an area indicated by a parity address. Upon receiving the parity address and a read/write request, the second memory device 240 may perform a read/write operation on the parity corresponding to the parity address. The second memory device 240 may include an input end for receiving the second invert indication information.

The second memory device 240 may receive second invert indication information from the parity updater 220 and the parity address from the data updater 210. The second invert indication information may be the target parity for the first data and may be overwritten as the target parity on the original parity in the area indicated by the parity address within the second memory device 240.

In this case, the first memory device 230 and the second memory device 240 may be physically separate devices such as physically separate memory chips. Alternatively, the first and second memory devices 230, 240 may be integrated in one physical device such as one physical memory chip.

As an example of the latter case, it is possible to configure a specific area as a first memory device 230 and a different area as a second memory device 240 on one physical memory chip. However, since the data and the parity for the data are separately stored, the two areas are different from each other.

Both the first memory device 230 and the second memory device 240 may be disposed within the controller 200 as shown in FIG. 3, but one or both may be external to the controller 200. If the first memory device 230 and the second memory device 240 are external to the controller 200, the controller 200 can perform data input/output to/from the first memory device 230 and the second memory device 240 through the memory interface of the controller 200 such as the internal memory interface 15 in FIG. 1.

As described above, the compromised protection scheme for coping with the soft error reads all the original data and the original parity in order to calculate the target parity for the first data, and then stores the first data and the target parity in the internal memory 16 in FIG. 1, even if only a part of the original data is updated.

In accordance with an embodiment, it is not necessary to read all the original data in order to generate the target parity for the first data when the original data is updated to the first data.

The example of generating parity for data through an error-correcting code with XOR operation such as SECDED Hamming Codes (13, 8) will be described with reference to FIGS. 4 to 6. FIG, but the present invention is not limited that specific coding technique.

The method of calculating the parity for the data described below may be applied to M parity bits (M is a natural number of 1 or more) for the data of N bits (N is a natural number of 1 or more). For example, the method may be applied to calculating 16-bit parity for 512-bit data.

Figure 4:
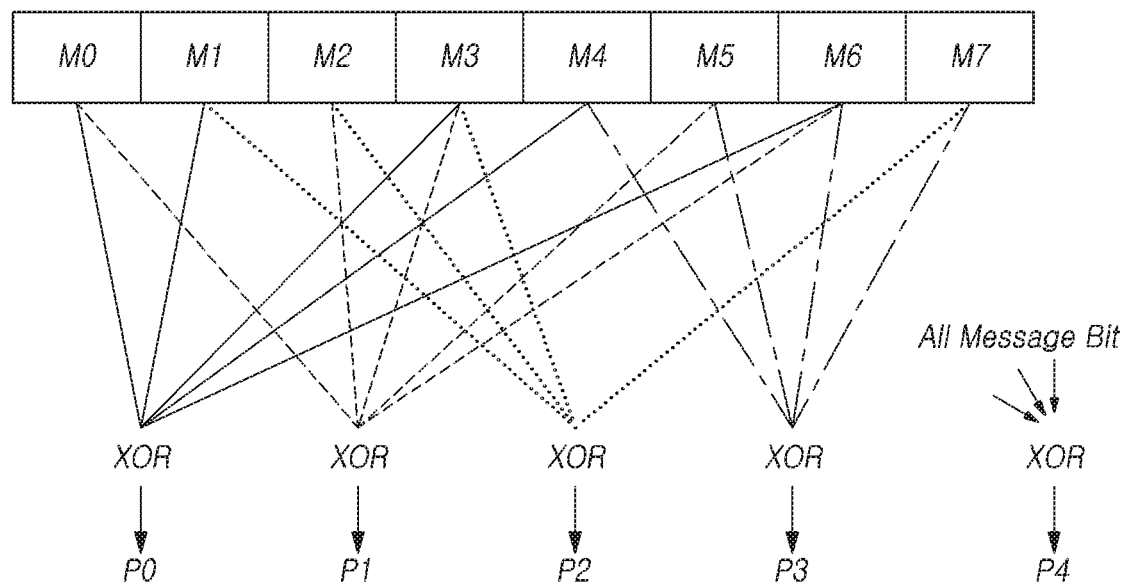
FIG. 4 is a schematic diagram illustrating how to generally calculate parity based on data in accordance with an embodiment.

FIG. 4 is a schematic diagram showing how to generally calculate parity based on data.

Referring to FIG. 4, in the conventional method for coping with soft errors, for example 4-bit ECC parity and 1-bit EDC parity may be calculated for 8-bit data. In this case, a total of 5 bits of the parity is derived for 8 bits of the data, so 8+5=13 bits are actually required for storing 8 bits of the data.

As an example, each of the 5 parity bits P0, P1, P2, P3, and P4 may be calculated for the 8 bits of data: M0, M1, M2, M3, M4, M5, M6, and M7 through an error-correcting code such as SECDED Hamming Codes (13, 8) as follows.

P0=M0 XOR M1 XOR M3 XOR M4 XOR M6
P1=M0 XOR M2 XOR M3 XOR M5 XOR M6
P2=M1 XOR M2 XOR M3 XOR M7
P3=M4 XOR M5 XOR M6 XOR M7
P4=M0 XOR M1 XOR M2 XOR M3 XOR M4 XOR M5 XOR M6 XOR M7 XOR P0 XOR P1 XOR P2 XOR P3

Here, P0, P1, P2, and P3 are the ECC parity, P4 is the EDC parity which is XOR operation result for all bits of M0 to M7 and all bits of P0 to P3 and is defined as an even/odd (ODD) parity.

The conventional method for coping with a soft error is disadvantageous in that it requires a large amount of overhead in a read/write operation because all the data must be read/written, even when only a part of the data is updated.

For example, first, the 8-bit original data of bits M0 to M7 is read and then the bits M4, M5, M6, and M7 are updated to M4', M5', M6', and M7'. By using the conventional method for coping with soft errors, 8-bit data is read from the internal memory, such as the internal memory 15 in FIG. 1, 4 bits of the 8-bit data are updated, and again a total of 13 bits (8 data bits and 5 parity bits) is rewritten in the internal memory.

The larger the size of the original data, the larger the amount of data to be read and to be rewritten for the update. This may be problematic in that it affects the bandwidth and power to be used for read/write operation of the internal memory in which the data and the parity are stored.

The storage device 100 in accordance with an embodiment may calculate parity for data of the protection unit without reading a part or all of the data of the protection.

Figure 5:
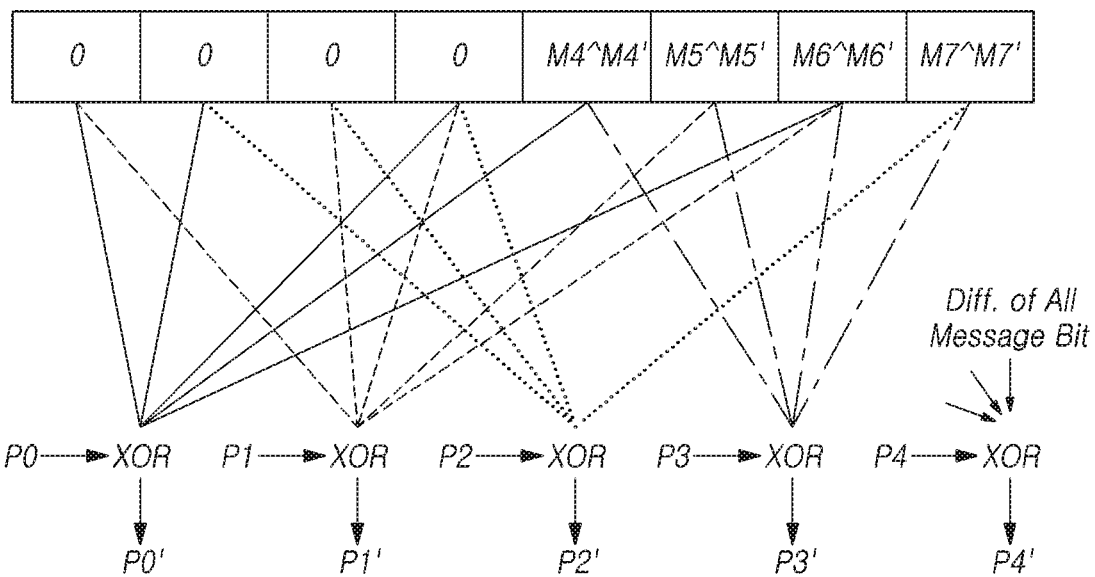
FIG. 5 is a schematic diagram illustrating how to calculate target parity based on original parity, original data and information of the to-be-updated data bits in accordance with an embodiment.

FIG. 5 is a schematic diagram showing how to calculate the target parity based on original parity, original data and information of the to-be-updated data bits in accordance with an embodiment.

Here, 8-bit original data M0, M1, M2, M3, M4, M5, M6, M7 is updated to the first data M0, M1, M2, M3, M4' M6', and M7'. Bit values of M4, M5, M6 and M7 in the 8-bit original data are updated to Bit values of M4', M5', M6' and M7', respectively. The to-be-updated bits M4', M5', M6' and M7' may be provided as the target data to the data updater 210.

Referring to FIG. 5, the first memory device 230 may output, as the second data, XOR operation results (M0 XOR M0), (M1 XOR M1), (M2 XOR M2), (M3 XOR M3), (M4 XOR M4'), (M5 XOR M5'), (M6 XOR M6') and (M7 XOR M7') performed on the original data and the first data.

In this case, the XOR operation results (M0 XOR M0), (M1 XOR M1), (M2 XOR M2) and (M3 XOR M3) are "0" because, in each case, the XOR operation is between the same values. XOR operation results (M4 XOR M4'), (M5 XOR M5'), (M6 XOR M6') and (M7 XOR M7') are either "0" or "1" according to whether or not the values being XORed are different.

The parity updater 220 may calculate the target parity P0', P1', P3', P4' from the second data and the original parities P0, P1, P2, P3 and P4.

As an example, the parity updater 220 may calculate the target parity P0' from the second data and the original parity P0. The same scheme may be applied to the other target parity bits P1', P2', P3' and P4'.

Referring to FIG. 4, in the conventional method, the target parity value P0' is calculated based on first data M0, M1, M2, M3, M4', M5', M6', and M7' as follows.

P0'=M0 XOR M1 XOR M3 XOR M4' XOR M6'

On the other hand, since the result of XOR operation on the same values does not affect the XOR operation, it can be changed as follows.

P0'=M0 XOR M1 XOR M3 XOR (M4 XOR M4) XOR (M6 XOR M6) XOR M4'XOR M6'
=(M0 XOR M1 XOR M3 XOR M4 XOR M6) XOR (M4 XOR M4') XOR (M6 XOR M6'
=P0 XOR (M4 XOR M4') XOR (M6 XOR M6')

Since the result of XOR operation on the same values does not affect the XOR operation, it can be changed as follows.

P0'=P0 XOR (M0 XOR M0) XOR (M1 XOR M1) XOR (M3 XOR M3) XOR (M4 XOR M4') XOR (M6 XOR M6')

Therefore, the parity updater 220 may calculate the target parity P0' from the second data and the original parity P0.

Referring again to FIG. 5, since (M0 XOR M0)=0, (M1 XOR M1)=0 and (M3 XOR M3)=0, the parity updater 220 calculates the target parity P0' from the original parities P0, and only a portion values (M4 XOR M4') and (M6 XOR M6') among the second data.

P0'=P0 XOR (M4 XOR M4') XOR (M6 XOR M6')

From the equation for the target parity P0', the target parity may be generated on the basis of the original parity and the second data and thus there is no need to further read a part or all of the original data during the update of the original parity to the target parity. The controller 200 may rewrite the target parity P0', P1', P2', P3', and P4' determined by the above-described scheme to the second memory device 240. The controller 200 may calculate the target parity for the first data only based on the original parity and the second data without further reading the to-be-updated bits or all of the original data. Since there is no need to perform a read/write operation for all of the original data stored in the first memory device 230 or remaining data bits that are not to be updated in the original data for generating the target parity, the overhead of the updating process for the data and its parity may be reduced as compared with the conventional scheme of coping with the problem.

If such a partial write is performed for very large data, the overhead in the updating process may be further reduced. For example, it is assumed that partial writing is performed only on 8-bit data among 512-bit data, and its parity is 13 bits. In this case, using the conventional scheme for coping with the soft error described with reference to FIG. 4, it is necessary to perform a reading/writing operation for 512+13=525 bits. However, the storage device 100 according to the embodiment may perform a reading/writing operation for 8+13=21 bits.

As described above, the controller 200 may perform an XOR operation on the original data and the first data to generate the second data.

If the XOR operation to the original data and the first data is performed without separately reading the original data, the time taken to perform the XOR operation between the original data and the first data may be reduced.

FIG. 6 is a diagram for explaining the principle of performing the XOR operation on the original data and the first data without reading the original data on the basis of the characteristics of the XOR operation in an embodiment.

Referring to FIG. 6, the principle of performing the XOR operation is that if the value B to be updated is "0", the result of the XOR operation on the original value A and the value B is the same as the original value A, and if the value B is "1", the result of the XOR operation on the original data and the value B is the inverted value of the original value A.

If the value B to be updated and the XOR operation result (i.e., the second data) are known, the original value A does not need to be read. Also, if the updated value B is "0", the original value A is outputted as the result of the XOR operation, and if the updated value B is "1", the inverted value of the original value A is outputted as the result of the XOR operation, so that an XOR operation value between them may be obtained without the XOR operation.

The first memory device 230 described above is implemented in a memory chip structure to output one of an original (non-inverted) value and an inverted value of the original data using the first invert indication information (i.e., the first data) so that it may obtain the same result value as the XOR operation result (i.e., the second data).

Figure 7:
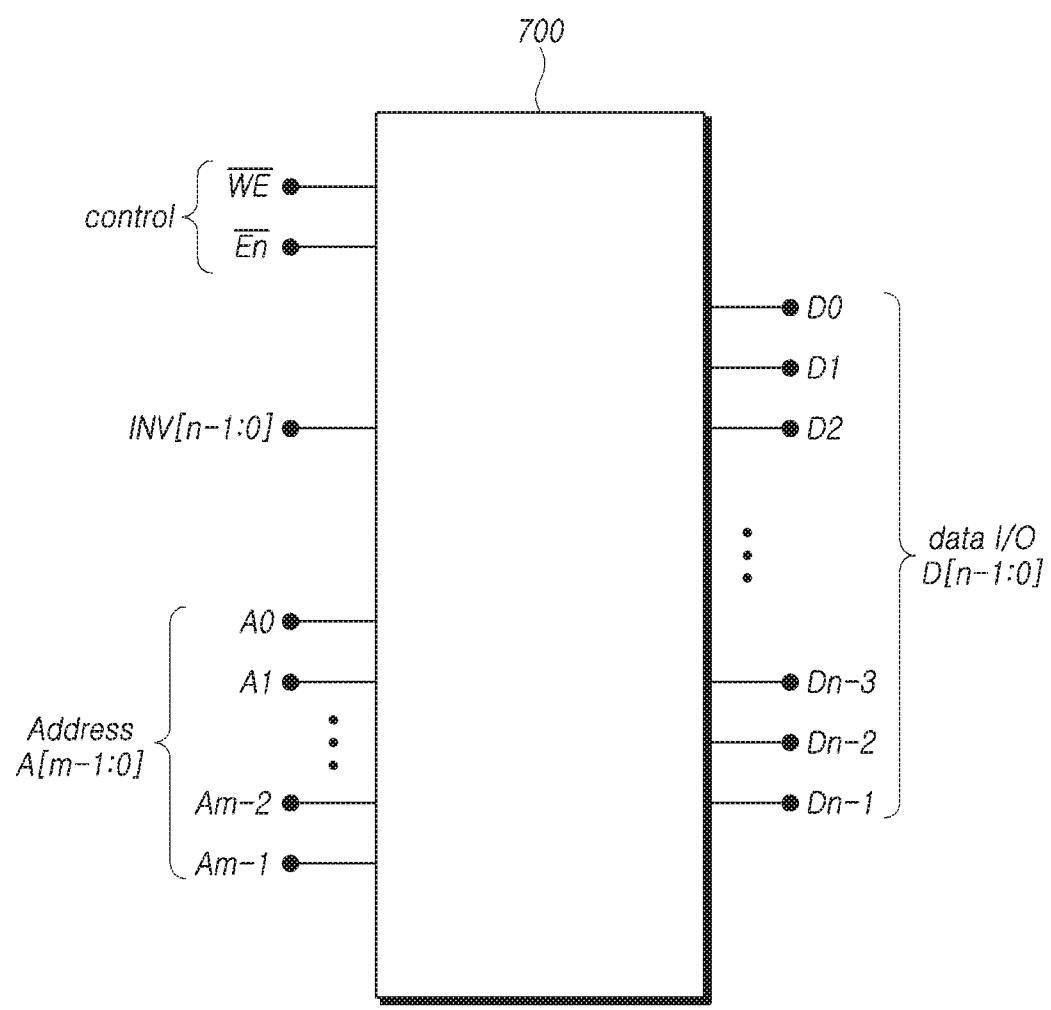
FIG. 7 is a diagram showing a first memory chip implementing a first memory device, such as that in FIG. 2.

FIG. 7 is a diagram showing a first memory chip implementing the first memory device in FIG. 2 in accordance with an embodiment.

Referring to FIG. 7, the first memory chip 700 receives the first invert indication information, and output one of the original (non-inverted) value and the inverted value of the original data using the first invert indication information (i.e., the first data).

The first memory chip 700 may include control signal lines En # and WE #, data address lines A [m−1: 0], data I/O lines (data I/O).

When the control signal input to one En # of the control signal lines is low, it means that the operation of the chip is possible.

A control signal input to the other WE # of the control signal lines indicates a signal indicating whether the first memory chip 700 performs a read operation or a write operation. For example, the write operation is instructed when the signal is low and the read operation is instructed when the control signal is high.

The address line A[m−1: 0] may be used to receive address information on data to be input or output.

The data input/output line Data I/O is used to output the data in the read operation or to receive the data in the write operation.

The first memory chip 700 further includes a pin INV [n−1: 0] for receiving invert instruction information for each bit in the original data corresponding to the data address in the address. That is, the first memory chip 700 includes a pin that operates as an input terminal for receiving the first invert indication information.

The first memory chip 700 may perform the read operation on n-bit data D [n−1: 0] with respect to the m-bit data address (m and n are arbitrary natural numbers of one or more) when the other En # of the control signal lines is applied to low and the other one of the control signal lines WE # is applied to high. The first memory chip 700 may also receive the first invert indication information (INV [n−1: 0]) for each bit of the n-bit data through the input end.

For example, the output value D [i] of the first memory chip 700 with respect to the bit indicated by the index i is determined according to the first invert indication information INV [i].

1) If INV [i]="0", the non-inverted value of the bit indicated by the index i is output as D [i].

2) If INV [i]="1", the inverted value of the bit indicated by the index i is output as D [i].

As described above with reference to FIG. 6, if the bit indicated by the index i in the original data is A and the invert indication information (i.e., the first data) is B, it is known that the D [i] is the result of the XOR operation on the bits A and B. That is, the result of the XOR operation on the bits A and B may be output as D [i] without reading the original data A.

In addition, the first memory chip 700 receives the first invert indication information, i.e., the first data, through the above-mentioned pin as the input end so that the original data stored in the first memory chip 700 is updated to the first data.

Figure 8:
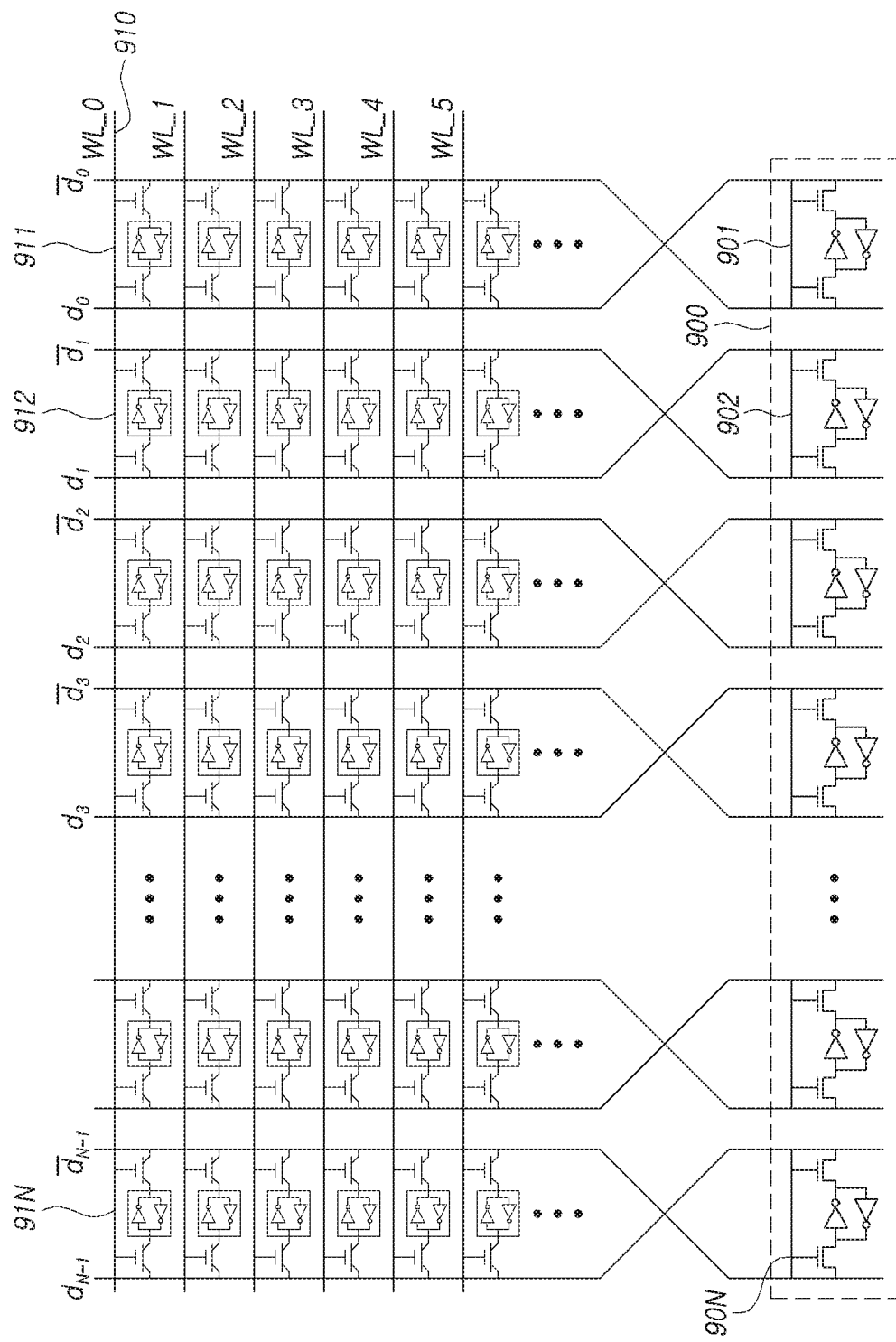
FIG. 8 is a partial circuit diagram included in the first memory device of FIG. 7.

FIG. 8 is a circuit diagram of a portion of the first memory chip 700 of FIG. 7.

Referring to FIG. 8, the first memory chip 700 in accordance with the present embodiment includes a plurality of memory cells 911 to 91N connected to one word line 910 and a plurality of inverting cells 901 to 90N respectively connected to the memory cells 911 to 91N.

The inverting cells 901 to 90N are included in the inverting cell array 900. Each inverting cell 90$i$ ($i$=1 to N) stores an inverted value of the value stored in corresponding memory cell 91$i$ connected to the inverting cell 90$i$. The first memory chip 700 outputs, according to the value corresponding to each bit among the first invert indication information, one of i) the value stored in each memory cell 91$i$ and ii) the inverted value thereof corresponding to the memory cell 91$i$.

Each memory cell 91*i* has two inverters to configure a storage cell to store a value. Each inverting cell 90*i* also has two inverters to configure a storage cell to store a value.

The BIT/BITbar lines of the inverting cell 90*i* and these of the corresponding memory cell 91*i* are reversely connected to each other. Therefore, the inverted value of the value stored in the corresponding memory cell 91*i* is stored in each inverting cell 90*i*.

The first memory chip 700 may include a multiplexer to selectively output, according to the value corresponding to each bit among the first invert indication information, one of i) the value stored in each memory cell 91*i* and ii) the inverted value thereof corresponding to the memory cell 91*i*. The inverting cell array 900 and the multiplexer may be included in a sense amplifier generally included in the first memory chip 700.

Figure 9:
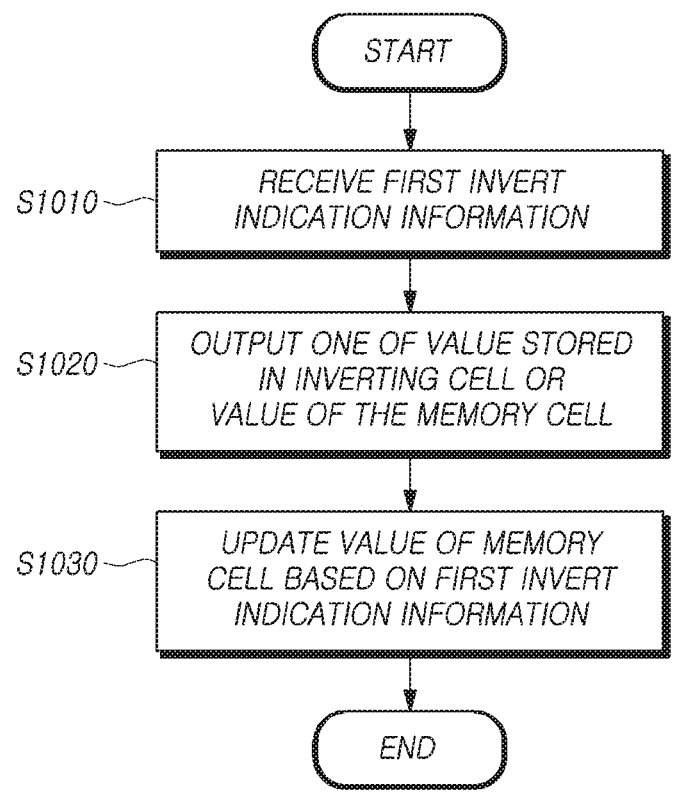
FIG. 9 is the flowchart of operation of a first memory chip, such as that in FIG. 7.

FIG. 9 is the flowchart of operation of the first memory chip in FIG. 7.

Referring to FIG. 9, the first memory chip 700 receives the first invert indication information (i.e., the first data) from the data updater 210 at S1010.

The first memory chip 700 outputs one of the inverted value stored in the inverting cell and the value stored in the memory cell at S1020. For example, if the first invert instruction information indicated by the index i is "1", the first memory chip 700 outputs the inverted value from the inverting cell 90*i* corresponding to the bit indicated by the index i.

On the other hand, if the first invert instruction information indicated by the index i is "0", the first memory chip 700 outputs the value stored the memory cell 91*i* corresponding to the bit indicated by the index i.

The first memory chip 700 updates the original data to the first invert indication information (i.e., the first data) within the memory cells 911 to 911N connected to a selected word line at S1030.

FIG. 10 is a diagram comparing many kinds of values corresponding to the bit indicated by the index i used in the first memory chip in FIG. 7.

Referring to FIG. 10, OLD [i] is a bit value of the original data stored in the memory cell 91*i*, INV [i] is a bit value of the invert indication information, INV_CELL [i] is an inverted bit value of the original data, the inverted bit value being stored in the inverting cell 90*i*, NEW[i] is a bit value of the first data or the first invert indication information, to which the original data is updated in the memory cell 91*i*, and D [i] is a bit value of the second data output from the first memory chip 700.

In the present embodiment, INV_CELL [i] is the inverted value of OLD [i]. The value of NEW [i] is equal to the value of the invert indication information indicated by INV [i]. The output D [i] is the result of the XOR operation to the values OLD [i] and NEW [i] and one of INV_CELL [i] and OLD [i].

Therefore, it is possible to output the second data D [i] obtained by performing the XOR operation on the original data OLD [i] and the first data INV [i] while updating the original data OLD [i] to the first data INV [i].

Figure 11:
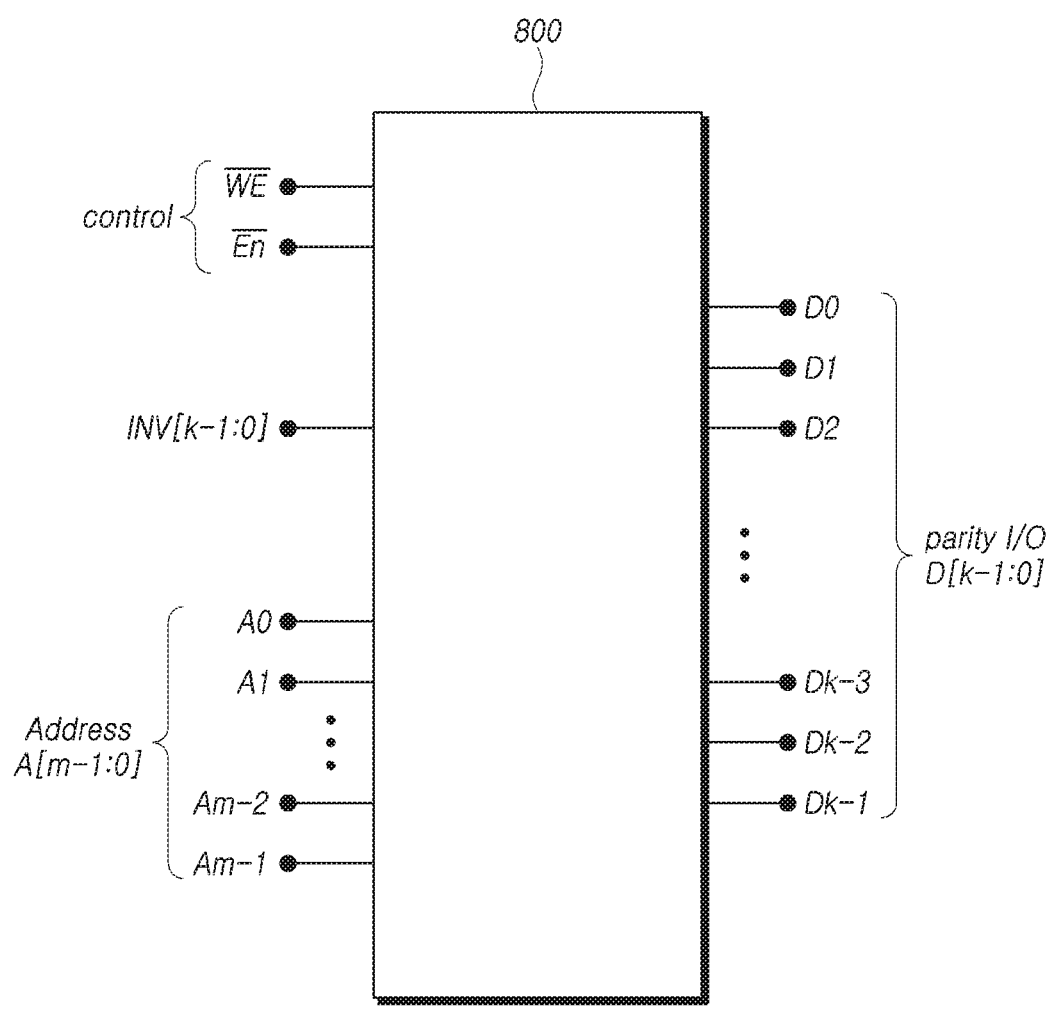
FIG. 11 is a diagram showing a pin configuration of a second memory chip for storing parity in accordance with an embodiment.

FIG. 11 is a diagram showing a pin configuration of a second memory chip 800 for storing parity in accordance with an embodiment.

Referring to FIG. 11, the second memory chip 800 in accordance with the present embodiment may have the same configuration as the first memory chip 700 described with reference to FIGS. 7 and 8.

The second memory chip 800 may include control signal lines En # and WE #, parity address lines A [m−1: 0], parity I/O lines (parity I/O) for bits k of the parity for the data stored in the first memory chip 700. The second memory chip 800 further includes a pin INV [k−1: 0] receiving the second invert instruction information (i.e., the target parity) corresponding to the parity address.

The pin INV [k−1: 0] may function as an input end to which the second invert indication information (i.e., the target parity) is input.

The second memory chip 800 comprises a plurality of memory cells connected to one word line and inverting cells respectively connected to the memory cells connected to one word line, wherein each of the inverting cells stores the inverted value of the value stored in each of the memory cells.

The second memory chip 800 may update the parity for the data, which is stored in the first memory chip 700, to the target parity using the second invert indication information received through the pins INV [k−1: 0] and the parity address transferred through the parity address lines A [m−1: 0].

Although the first memory chip 700 described in FIG. 7 and the second memory chip 800 storing the parity described in FIG. 10 have the same pin configuration, the internal configurations of them may be different from each other. For example, the second memory chip 800 may not include an input terminal, i.e., pins INV [k−1: 0], through which the second invert indication information is input.

Figure 12:
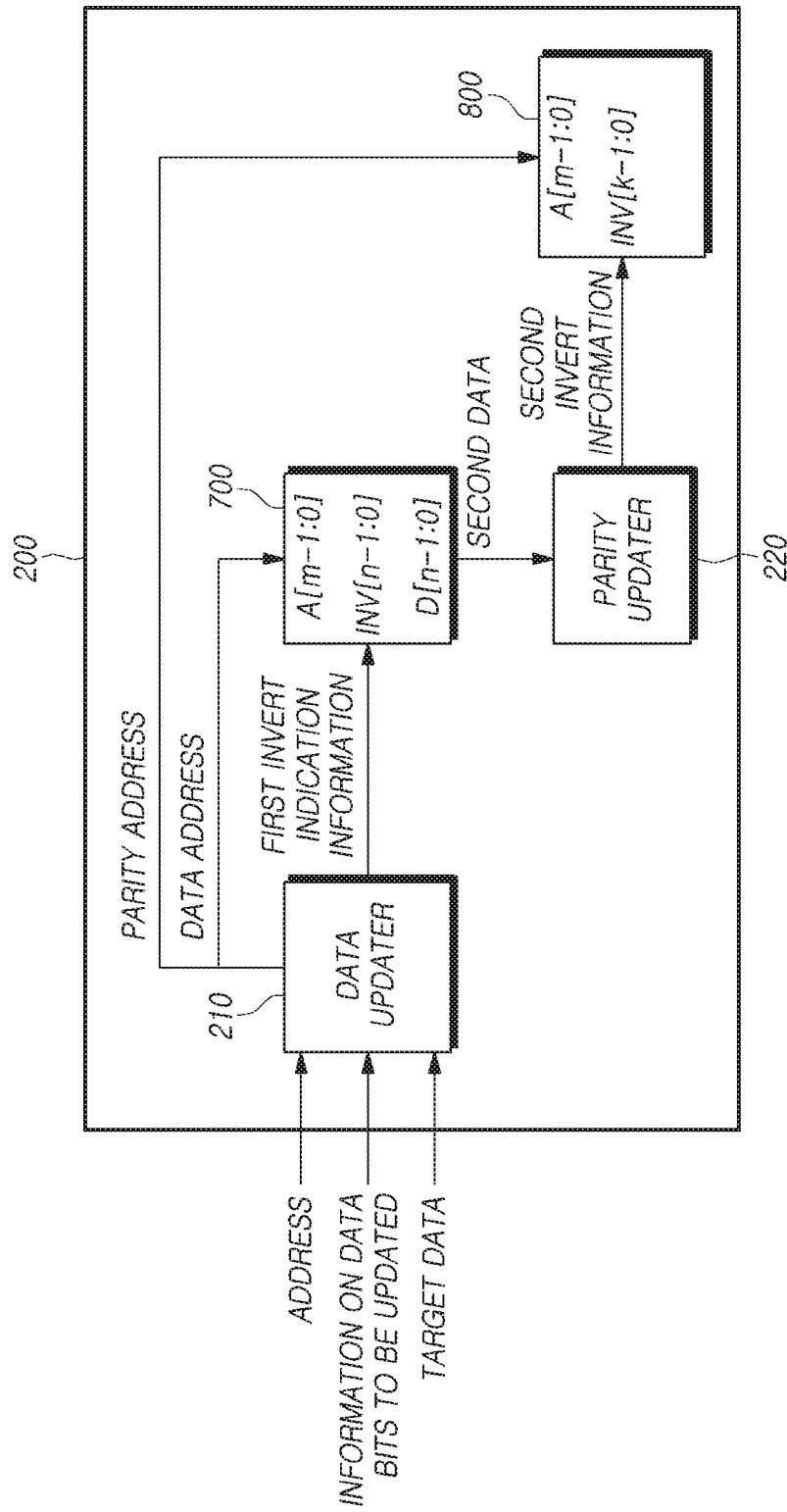
FIG. 12 is a block diagram illustrating operation of a controller including first and second memory chips, such as described in FIGS. 7 and 8.

FIG. 12 is a block diagram illustrating the operation of the controller 200 including the first memory chip 700 and the second memory chip 800 described in FIGS. 7 and 11.

Referring to FIG. 12, the first memory device 230 in FIG. 3 may be implemented through the first memory chip 700 in FIG. 7. The second memory device 240 in FIG. 3. may be implemented through the second memory chip 800 described with reference to FIG. 11.

The data updater 210 transfers the first invert indication information to the first memory chip 700 based on the address, the information of the to-be-updated data bits and the target data for the to-be-updated data bits.

The first invert indication information is transferred to the pins INV [n−1: 0] of the first memory chip 700.

The value of the address for the data may be transferred to the data address lines A [m−1: 0] of the first memory chip 700.

The first memory chip 700 may output to the pins D [n−1: 0] the second data calculated on the basis of the original data, the information of the to-be-updated data bits and the target data. Calculating the second data may be carried out according to the principles described with reference to FIG. 9.

The parity updater 220 receives the second data from the first memory chip 700 and calculates the target parity. Here, the method described with reference to FIG. 5 may be used to calculate the target parity.

The parity updater 220 may transfer the calculated target parity to the second memory chip 800. The calculated target parity is transferred via the pins INV [k−1: 0] for receiving the second invert indication information in the second memory chip 800.

The second memory chip 800 may update the original parity to the target parity using the second invert indication information received on the pins INV [k−1: 0] and the parity address transferred to the parity address lines A [m−1: 0].

Figure 13:
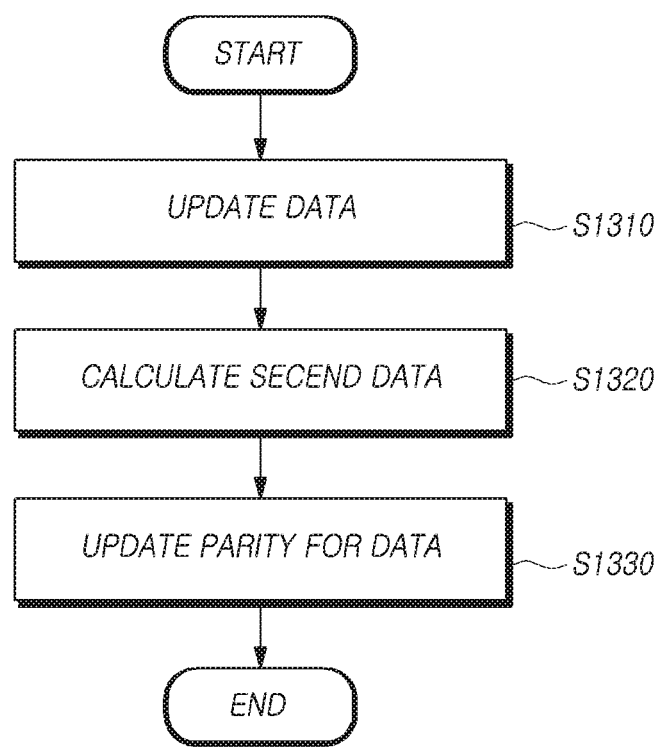
FIG. 13 is a flowchart of a method for operating a storage device in accordance with an embodiment.

FIG. 13 is a flowchart of a method for operating the storage device 100 in FIG. 2 in accordance with an embodiment.

Referring to FIGS. 2 and 13, in addition to FIG. 13, the storage device 100 updates data stored in an area of the first memory device 230 indicated by the data address from the original data to first data based on the data address, information on the to-be-updated data bits and the target data at step S1310.

The storage device 100 may calculate second data based on the original data and the first data.

For example, the data updater 210 in the controller 200 of the storage device 100 transfers the first invert indication information to the first memory device 230. The first invert indication information is determined based on the information on the to-be-updated data bits and the target data. The first memory device 230 may update the original data stored in the area indicated by the data address to the first data, and may calculate and output the second data.

Then, the controller 200 of the storage device 100 calculates the target parity using the second data and updates the parity for the original data indicated by the parity address to the target parity for the first data at S1320.

Specifically, the parity updater 220 in the controller 200 of the storage device 100 calculates the target parity and transfers the calculated target parity as the second invert indication information to the second memory device 240. The second memory device 240 may update the original parity to the target parity.

The storage apparatus in accordance with embodiments of the present invention has the effect of reducing cycle overhead required for updating the data and its parity in the partial writing process and consequently increasing the bandwidth of data writing.

When a conventional EDC/ECC protection method is used to protect the data stored in the memory, in partial write of protection unit data, cycles of Read-Modify-Write (RMW) operation for all of the data and its parity should be performed in order to update the data and the EDC/ECC parity for the updated data. Thus, two cycles must be performed, one for the update of the data and one for the update of the parity.

However, the storage device 100 in accordance with embodiments of the present invention performs an operation of selectively inverting and outputting only a specific bit value in order to derive an XOR operation value required for calculating the target parity, which storage device 100 uses optimized memory devices.

Accordingly, the storage device 100 in accordance with embodiments may calculate the target parity while updating the original data, so that one cycle of the RMW operation may be performed for the update of the original data without needing to read any of the original data for the update of the original parity. The original parity is updated to the target parity based on the original parity and the second data and thus there is no need to further read any of the original data during the update of the original parity to the target parity.

Therefore, the storage device 100 in accordance with embodiments of the present invention is capable of using memory accesses such as a byte, a half-word, a full-word and performing the partial write operation with no additional cycle. Reducing cycle overhead is advantageous for protecting the data stored in the internal memory.

Figure 14:
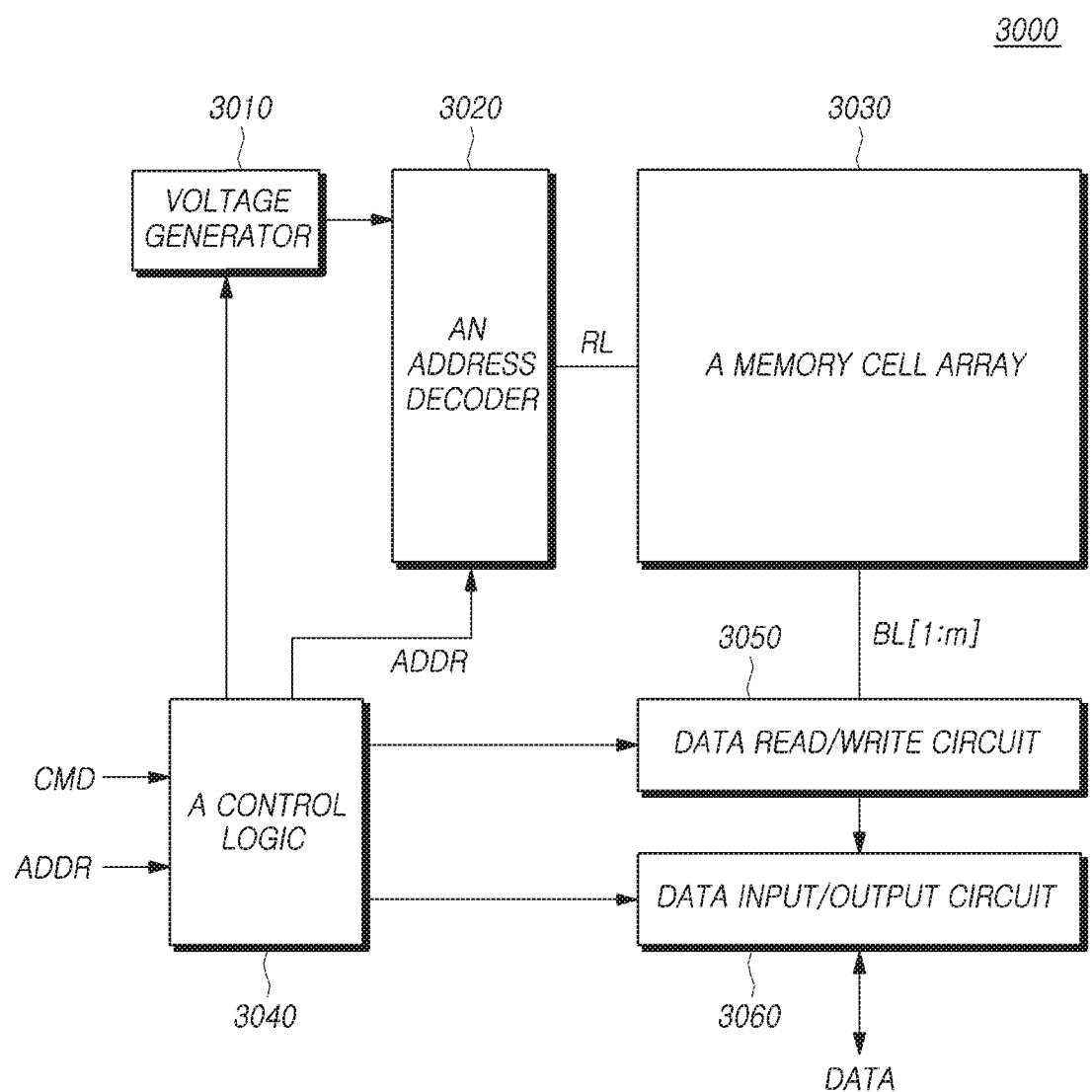
FIG. 14 is a block diagram of an exemplary semiconductor memory device, such as that in FIG. 2.

FIG. 14 is a diagram illustrating an exemplary configuration the semiconductor memory device of FIG. 1.

Referring to FIG. 14, the semiconductor memory device 3000 may include a voltage generator 3010, an address decoder 3020, a memory cell array 3030, a control logic 3040, a data read/write circuit 3050, and a data input/output circuit 3060.

The memory cell array 3030 may include a plurality of memory blocks. The plurality of memory blocks are connected to an address decoder 3020 through word lines WL. The plurality of memory blocks are also connected to the data read/write circuit 3050 through bit lines BL[1:m].

Each of the memory blocks includes a plurality of memory cells. In an embodiment, the plurality of memory cells are nonvolatile memory cells. In the plurality of memory cells, memory cells coupled to the same row line RL are defined as a single page. That is, the memory cell array 3030 is composed of a plurality of pages.

In this embodiment, each of the plurality of memory blocks included in the memory cell array 3030 may include one or more dummy cells. The dummy cell(s) may be coupled in series between a drain select transistor and the memory cells and between a source select transistor and the memory cells.

The memory cells of the semiconductor memory device 3000 may each be implemented as one of a single-level cell (SLC) capable of storing a single data bit, or a multi-level cell (MLC) capable of storing two or more data bits, including, for example, a triple-level cell (TLC) capable of storing three data bits, or a quad-level cell (QLC) capable of storing four data bits.

The address decoder 3020 is coupled to the memory cell array 3030 through row lines RL. The row lines RL may include drain select lines, word lines, source select lines, and a common source line. In this embodiment, the word lines may include normal word lines and dummy word lines. In an embodiment, the row lines RL may further include a pipe select line.

The address decoder 3020 is configured to be operated under the control of the control logic 3040. The address decoder 3020 receives the address ADDR from the control logic 3040.

The address decoder 3020 is configured to decode a block address of the received address ADDR. The address decoder 3020 selects at least one memory block from among the memory blocks in response to the decoded block address. The address decoder 3020 is configured to decode a row address of the received address ADDR. The address decoder 3020 may select at least one word line of the selected memory block by applying voltages supplied from the voltage generator 3010 to at least one word line WL in response to the decoded row address.

During a program operation, the address decoder 3020 may apply a program voltage to the selected word line and apply a pass voltage having a level lower than that of the program voltage to unselected word lines. During a program verify operation, the address decoder 3020 may apply a verify voltage to a selected word line and apply a verification pass voltage higher than the verify voltage to unselected word lines.

During a read operation, the address decoder 3020 may apply a read voltage to a selected word line and apply a pass voltage higher than the read voltage to unselected word lines.

In this embodiment, the erase operation of the semiconductor memory device 3000 may be performed on a memory block basis. During an erase operation, the address ADDR input to the semiconductor memory device 3000 includes a block address. The address decoder 3020 may decode the block address and select a single memory block in response to the decoded block address. During the erase operation, the address decoder 3020 may apply a ground voltage to word lines coupled to the selected memory block.

In this embodiment, the address decoder 3020 may be configured to decode a column address of the received address ADDR. A decoded column address DCA may be transferred to the data read/write circuit 3050. In an embodiment, the address decoder 3020 may include components such as a row decoder, a column decoder, and an address buffer.

The voltage generator 3010 is configured to generate a plurality of voltages using an external supply voltage provided to the semiconductor memory device 3000. The voltage generator 3010 is operated under the control of the control logic 3040.

In this embodiment, the voltage generator 3010 may generate an internal supply voltage by regulating the external supply voltage. The internal supply voltage generated by the voltage generator 3010 is used as an operating voltage of the semiconductor memory device 3000.

In this embodiment, the voltage generator 3010 may generate a plurality of voltages using an external supply voltage or an internal supply voltage. The voltage generator 3010 may be configured to generate various voltages required by the semiconductor memory device 3000. For example, the voltage generator 3010 may generate a plurality of program voltages, a plurality of pass voltages, a plurality of select read voltages, and a plurality of unselect read voltages.

For example, the voltage generator 3010 may include a plurality of pumping capacitors for receiving the internal supply voltage and may generate a plurality of voltages by selectively activating the pumping capacitors under the control of the control logic 3040.

The generated voltages may be supplied to the memory cell array 3030 by the address decoder 3020.

The data read/write circuit 3050 may include first to m-th page buffers, which may be coupled to the memory cell array 3030 through the first to m-th bit lines, respectively. The first to m-th page buffers are operated under the control of the control logic 3040.

The first to m-th page buffers may perform data communication with the data input/output circuit 3060. During a program operation, the first to m-th page buffers may receive data to be stored DATA through the data input/output circuit 3060 and data lines DL.

During a program operation, the first to m-th page buffers may transfer the data DATA, received through the data input/output circuit 3060, to selected memory cells through the bit lines when a program pulse is applied to each selected word line. The memory cells in the selected page are programmed based on the transferred data DATA. Memory cells coupled to a bit line to which a program permission voltage (e.g., a ground voltage) is applied may have increased threshold voltages. Threshold voltages of memory cells coupled to a bit line to which a program prohibition voltage (e.g., a supply voltage) is applied may be maintained. During a program verify operation, the first to m-th page buffers read page data from the selected memory cells through the bit lines.

During a read operation, the data read/write circuit 3050 reads data DATA from the memory cells in the selected page through the bit lines BL, and outputs the read data DATA to the data input/output circuit 3060.

During an erase operation, the data read/write circuit 3050 may allow the bit lines BL to float. In this embodiment, the data read/write circuit 3050 may include a column select circuit.

The data input/output circuit 3060 is coupled to the first to m-th page buffers through the data lines DL. The data input/output circuit 3060 is operated under the control of the control logic 3040.

The data input/output circuit 3060 may include a plurality of input/output buffers (not illustrated) for receiving input data. During a program operation, the data input/output circuit 3060 receives data to be stored DATA from an external controller (not shown). During a read operation, the data input/output circuit 3060 outputs the data, received from the first to m-th page buffers included in the data read/write circuit 3050, to the external controller.

The control logic 3040 may be coupled to the address decoder 3020, the voltage generator 3010, the read and write circuit 3050, the data input/output circuit 3060. The control logic 3040 may control the overall operation of the memory device 3000. The control logic 3040 may be operated in response to a command CMD received from an external device.

As the foregoing describes, embodiments of the present invention may efficiently manage data stored in an internal memory and parity for the data in a storage device.

While various embodiments of the present invention have been disclosed, those skilled in the art will appreciate in light of the present disclosure that various modifications, additions and substitutions are possible, without departing from the scope and spirit of the present disclosure. Therefore, the scope of the present invention is defined by the accompanying claims and equivalents thereof rather than by the above-described embodiments.

In the above-discussed embodiments, not all steps may be performed and in some cases, one or more steps may be skipped. In addition, steps may not always performed in regular order. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the accompanying claims and equivalents thereof.

What is claimed is:

1. A storage device comprising:
   a semiconductor memory device; and
   a controller for controlling the semiconductor memory device,
   wherein the controller comprises,
   a data updater circuitry controlling so as to update original data stored in an area indicated by an address to first data based on a) the address, b) information on to-be-updated data bits indicating indices of bits in a binary bit stream of the first data at which the original data are to be updated and c) target data for the to-be-updated data bits; and
   a parity updater circuitry controlling so as to update original parity for the original data to a target parity, using second data obtained by the parity updater circuitry based on a) the original data and b) first invert indication information, wherein the first invert indication information is obtained based on a) the information on to-be-updated data bits and b) the target data, the controller calculates the target parity based on the original parity and the second data without further reading all of the original data, wherein the controller further comprises a first memory device in which the original data is stored, wherein the data updater circuitry transmits, to the first memory device, the first invert indication information, wherein the first invert indication information indicates that the first memory device outputs, for each bit of the original data, an inverted value of the bit of the original data when a bit of the first invert indication information corresponding to the bit of the original data is 1 and outputs an original bit value of the bit of the original data when a bit of the first invert indication information corresponding to the bit of the original data is 0, wherein the first memory device comprises a plurality of memory cells connected to one word line and a plurality of inverting cells included in an inverting cell array and respectively connected to the memory cells, wherein each inverting cell of the plurality of inverting cells stores therein an inverted value of a value stored in a memory cell, corresponding to the inverting cell, among the plurality of memory cells, and wherein the first memory device outputs the inverted value from the plurality of inverting cells when a bit of the first invert indication information corresponding to the original bit value is 1 and outputs the original bit value from the plurality of memory cells when a bit of the first invert indication information corresponding to the original bit value is 0.

2. The storage device according to claim 1, wherein the first memory device comprises an input to which the first invert indication information is input, stores the original data in the area, and updates the original data in the area to the first data based on the first invert indication information and outputs the second data.

3. The storage device according to claim 2, wherein BIT and BITbar lines of the inverting cell and BIT and BITbar lines of the memory cell corresponding to the inverting cell are reversely connected to each other.

4. The storage device according to claim 3, wherein the first memory device outputs, according to a value corresponding to one of the to-be-updated data bits in the first invert indication information, one of the value stored in the memory cell and the inverted value stored in the inverting cell as a value corresponding to the one of to-be-updated data bits in the second data.

5. The storage device according to claim 4, wherein the value corresponding to one of the to-be-updated data bits in the first invert indication information is a value corresponding to one of the to-be-updated data bits in the target data.

6. The storage device according to claim 5, wherein the value stored in the memory cell is updated to the value corresponding to one of the to-be-updated data bits in the target data.

7. The storage device according to claim 1, wherein the controller further comprises a second memory device in which the original parity is stored, wherein the parity updater circuitry transmits, to the second memory device, second invert indication information for the target parity, and wherein the second memory device comprises an input to which the second invert indication information is input, stores the original parity, and updates the original parity to the target parity based on the second invert indication information.

8. The storage device according to claim 7, wherein the second memory device comprises a plurality of memory cells connected to one word line and a plurality of inverting cells respectively connected to the memory cells, and wherein each of the inverting cells store an inverted value of a value stored in each of the memory cells.

9. The storage device according to claim 8, wherein the second memory device outputs, according to each bit of the second invert indication information, one of the value stored in the memory cell and the inverted value stored in the inverting cell as the value of the second data corresponding to the to-be-updated data bit.

10. A controller for controlling a semiconductor memory device, the controller comprising:

a data updater circuitry controlling so as to update original data stored in an area of the semiconductor memory device indicated by an address to first data based on a) the address, b) information on the to-be-updated data bits indicating indices of bits in a binary bit stream of the first data at which the original data are to be updated and c) target data for the to-be-updated data bits; and a parity updater circuitry controlling so as to update original parity for the original data to a target parity, using second data obtained by the parity updater circuitry based on a) the original data and b) first invert indication information, wherein the first invert indication information is obtained based on a) the information on to-be-updated data bits and b) the target data, wherein the controller calculates the target parity based on the original parity and the second data without further reading all of the original data, wherein the controller further comprises a first memory device in which the original data is stored, wherein the data updater circuitry transmits, to a first memory device, the first invert indication information, wherein the first invert indication information indicates that the first memory device outputs, for each bit of the original data, an inverted value of the bit of the original data when a bit of the first invert indication information corresponding to the bit of the original data is 1 and outputs an original bit value of the bit of the original data when a bit of the first invert indication information corresponding to the bit of the original data is 0, wherein the first memory device comprises a plurality of memory cells connected to one word line and a plurality of inverting cells included in an inverting cell array and respectively connected to the memory cells, wherein each inverting cell of the plurality of inverting cells stores therein an inverted value of a value stored in a memory cell, corresponding to the inverting cell, among the plurality of memory cells, and wherein the first memory device outputs the inverted value from the plurality of inverting cells when a bit of the first invert indication information corresponding to the original bit value is 1 and outputs the original bit value from the plurality of memory cells when a bit of the first invert indication information corresponding to the original bit value is 0.

11. The controller according to claim 10,
wherein the first memory device comprises an input to which the first invert indication information is input, stores the original data in the area, and updates the original data to the first data based on the first invert indication information and calculates the second data.

12. The controller according to claim 11,
wherein BIT and BITbar lines of the inverting cell and BIT and BITbar lines of the memory cell corresponding to the inverting cell are reversely connected to each other.

13. The controller according to claim 12, wherein the first memory device outputs, according to a value corresponding to one of the to-be-updated data bits in the first invert indication information, one of the value stored in the memory cell and the inverted value stored in the inverting cell as a value corresponding to the one of to-be-updated data bits in the second data.

14. The controller according to claim 13, wherein the value corresponding to the one of the to-be-updated data bits in the first invert indication information is a value corresponding to the one of the to-be-updated data bit in the target data.

15. The controller according to claim 10,
further comprising a second memory device at which the original parity is stored,
wherein the parity updater circuitry transmits, to the second memory device, second invert indication information for the target parity, and
wherein the second memory device comprises an input to which the second invert information is input, stores the original parity, and updates the original parity to the target parity based on the second invert indication information.

16. The controller according to claim 15,
wherein the second memory device comprises a plurality of memory cells connected to one word line and a plurality of inverting cells respectively connected to the memory cells, and
wherein each of the inverting cells store an inverted value of a value stored in each of the memory cells.

17. The controller according to claim 16, wherein the second memory device outputs, according to each bit of the second invert indication information, one of the value stored in the memory cell and the inverted value stored in the inverting cell as the value of the second data corresponding to the to-be-updated data bit.

18. A method for operating a storage device, the method comprising:
updating original data stored in an area of the storage device indicated by an address to first data based on a) the address, b) information on the to-be-updated data bits indicating indices of bits in a binary bit stream of the first data at which the original data are to be updated and c) target data for the to-be-updated data bits; and
updating original parity for the original data to a target parity, using second data obtained based on a) the original data and b) first invert indication information,
wherein the first invert indication information is obtained based on a) the information on to-be-updated data bits and b) the target data,
wherein the target parity is calculated based on the original parity and the second data without further reading all of the original data,
wherein the original data is updated to the first data based on the first invert indication information and outputs the second data,
wherein the first invert indication information indicates that, for each bit of the original data, an inverted value of the bit of the original data is outputted when a bit of the first invert indication information corresponding to the bit of the original data is 1 and an original bit value of the bit of the original data is outputted when a bit of the first invert indication information corresponding to the bit of the original data is 0,
wherein the original bit value is outputted from a plurality of memory cells storing the original bit value when a bit of the first invert indication information corresponding to the bit of the original data is 0, and
wherein the inverted value is outputted from a plurality of inverting cells, each stores an inverted value of a value stored in a corresponding memory cell among the plurality of memory cells, when a bit of the first invert indication information corresponding to the bit of the original data is 1.

19. The method according to claim 18, wherein the original parity is updated to the target parity according to second invert indication information obtained from the target parity.

* * * * *